United States Patent [19]
Becker

[11] Patent Number: 5,826,415
[45] Date of Patent: Oct. 27, 1998

[54] CORN GATHERING AND CONVEYING BELT SYSTEM

[75] Inventor: Aaron T. Becker, Davenport, Iowa

[73] Assignee: Case Corporation, Racine, Wis.

[21] Appl. No.: 781,133

[22] Filed: Jan. 9, 1997

[51] Int. Cl.[6] .................................................. A01D 45/02
[52] U.S. Cl. ........................ 56/66; 56/84; 56/94; 56/119
[58] Field of Search ................................ 56/59, 66, 69, 56/73, 75, 78, 80, 82, 84, 88, 89, 93, 94, 98, 106, 108, 109, 111, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 3,995,412 | 12/1976 | Gaeddert et al. ........................... 56/98 |
| 4,009,557 | 3/1977 | Reicks . |
| 4,106,270 | 8/1978 | Weigand et al. . |
| 4,227,368 | 10/1980 | Mossman et al. . |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996—"Build–It–Yourself" Narrow Row Header Kit.
*Farm Industry News*, vol. 29, No. 11, 1996—"Does Narrow Row Corn Add Up?".
*Ontario Farmer*, vol. 29, No. 40, 1996—"Thinking 15–Inch".
1000 Series Corn Head, Operators Manual, 1995 Case Corporation.
1000 Series Corn Head, Parts Catalog, 1993 Case Corporation.
Allis–Chalmers Tractor Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company (Date Unknown).
Instruction Manual and Parts List, "Snapping Unit Frame Field Improvement Parts for McCormick–Deering, No. 14P, No. 24, Corn Pickers", International Harvester Company (Date Unknown).
CP–8 McCormick Parts Catalog, "34HM–20 Corn Picker, 34HM–21 Corn Snapper, 34HM–22 Sweet Corn Picker (Two–Row, Mounted–Type)", International Harvester Company (Date Unknown).

*Primary Examiner*—Terry Lee Melius
*Attorney, Agent, or Firm*—Foley & Lardner

[57] ABSTRACT

An improved row crop header is provided for an agricultural harvesting machine. The row crop header includes a frame and a plurality of row units mounted to the frame. Each of the row units has a first gatherer and a second gatherer, both of which have an upper surface. The first gatherer includes a continuous belt. The first and second gatherers are mounted to the frame such that the upper surfaces of the first and second gatherers form a trough. This arrangement of the first and second gatherers allows row units to be spaced closer together.

23 Claims, 3 Drawing Sheets

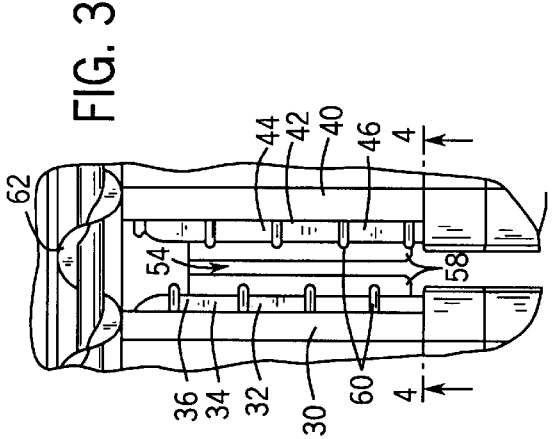
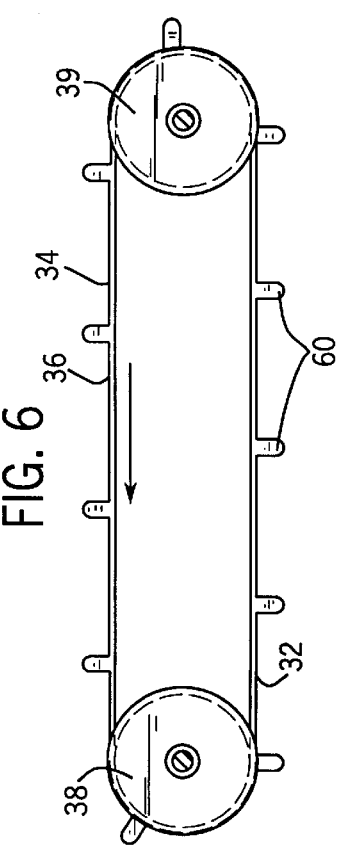
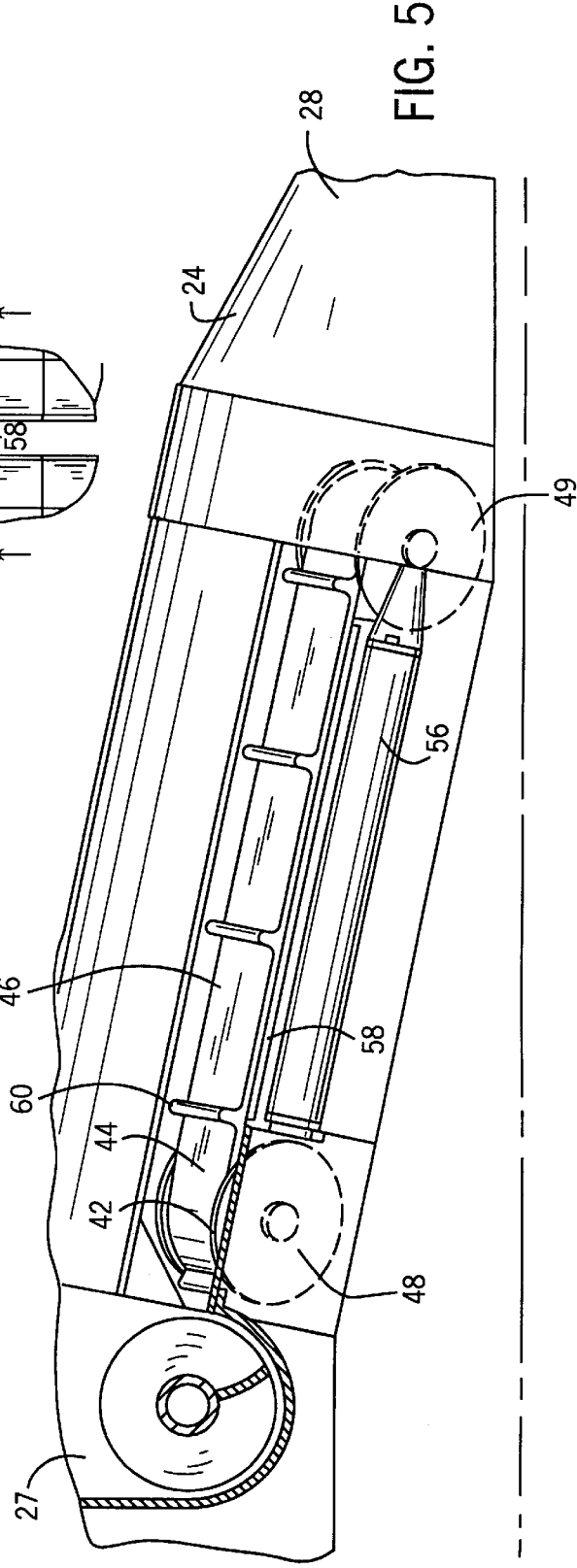

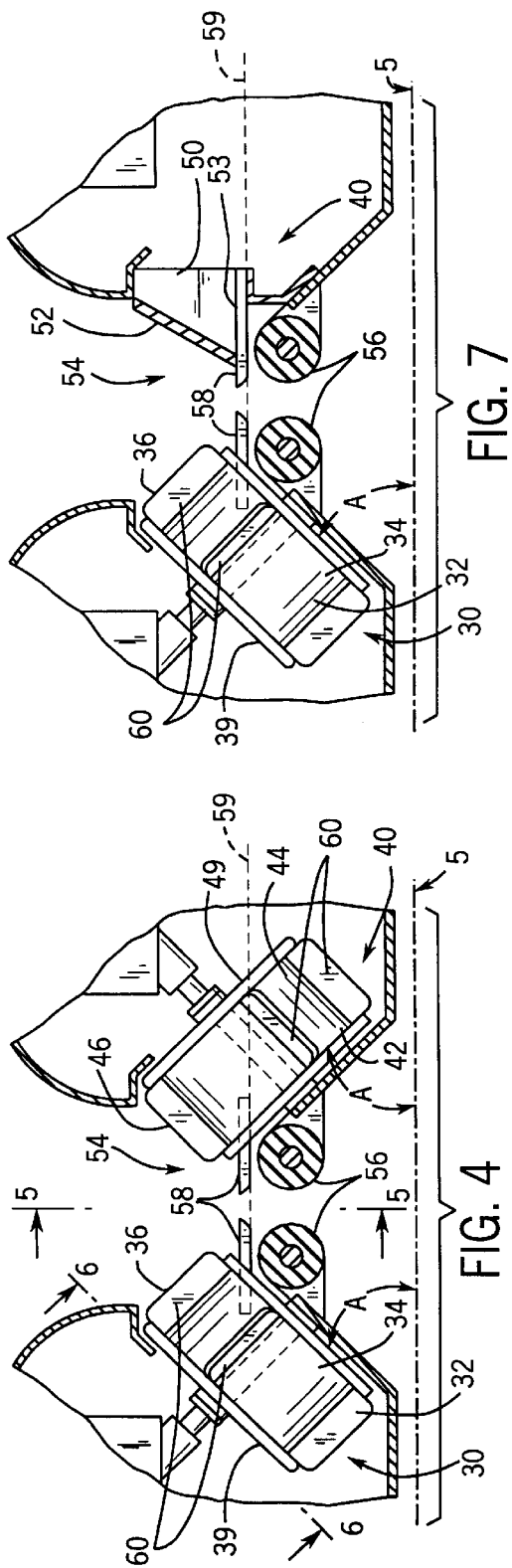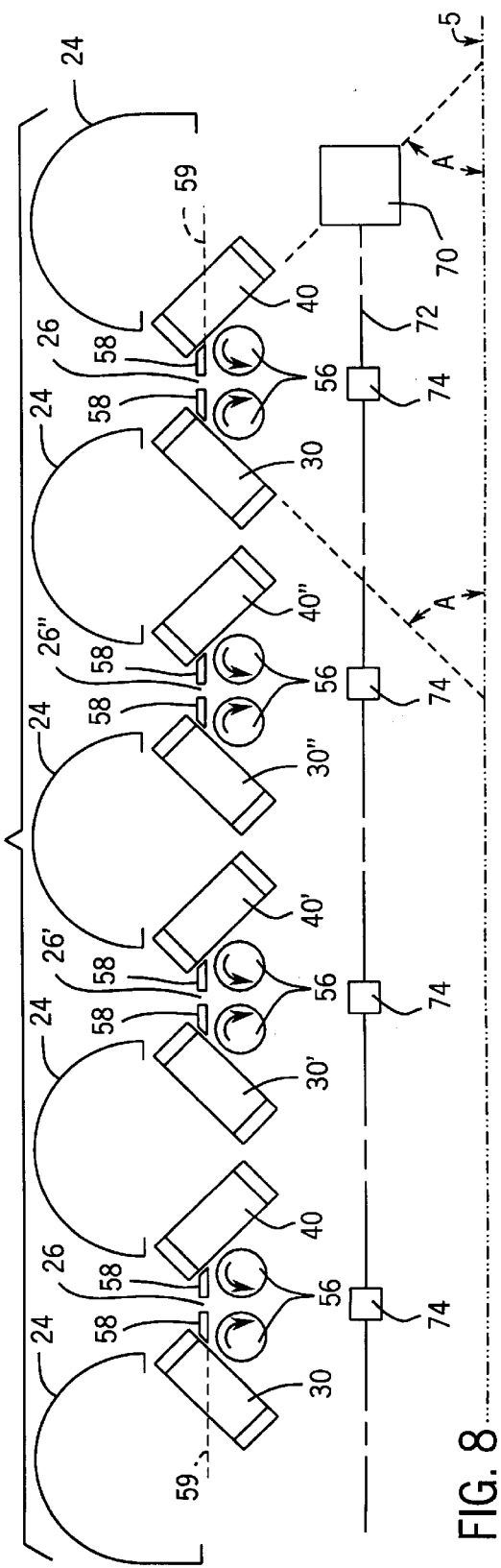

CORN GATHERING AND CONVEYING BELT SYSTEM

FIELD OF THE INVENTION

The present invention relates generally to a row crop harvesting machine and, more particularly, to a header for a row crop harvesting machine that is designed to harvest crops, such as corn, planted in narrower rows than in the past.

BACKGROUND OF THE INVENTION

Several variations of header units have been used in combines or harvesting machines for harvesting row crops such as corn and cotton. One of the first header units was a corn head with fixed spacing between row units. Several other corn heads for harvesting variably spaced crop rows were then developed.

Conventional headers have row units, each of which typically includes two gathering chains, two snapping rolls and a pair of associated stripper plates. In operation, the snapping rolls rotate to pull the corn stalk downward and past the stripper plates. As the stalk is pulled downward, the ears of corn which are attached to the stalk are stripped from the stalk by the stripper plates. The stripped ears are then conveyed to an auger of the header by the gathering chains.

The last several years have seen a rapid increase in research and development: relating to the effect of varying row widths on the growth of corn and other row crops, and header development has not kept pace. Existing corn heads and harvesting machines normally are designed to harvest corn planted in rows having a row width of greater than 20 inches. Because existing corn heads have the gatherers of their row units in the same plane, there is a limitation on the minimum distance row units can be arranged together.

For example, in a typical corn head having a plurality of row units, both gatherers of each row unit are positioned in the same plane, and adjacent gatherers of adjacent row units are also positioned in the same plane. This arrangement limits the spacing of adjacent row units, since the gatherers of adjacent row units can interfere with each other if the adjacent row units are positioned too close to one another. As the technology to build the chains and gears required for efficient operation limits the minimum width of a row unit, the positioning of adjacent row units determines the minimum crop row width that can be efficiently harvested by existing corn heads. Current technology limits row widths to about 20 inches, because the gatherers in adjacent row units of existing corn heads interfere with one another if they are brought any closer.

Recent research on the spacing of the corn rows has indicated special benefits for narrower row spacings that are 12–15 inches apart. In addition to the increase in yield and crop population, these benefits include improved erosion control and better weed control. Narrower rows also require less chemicals and pesticides per unit of yield, thereby benefiting the environment.

Existing header units are not designed to harvest rows having a spacing of 15 inches or less. Consequently, they are very wasteful and inefficient in harvesting narrow rows leading to a sub-optimal harvesting efficiency.

In view of the current design of corn headers, it would be desirable to reduce the spacing between row units. Furthermore, it would be desirable to simplify and reduce the weight of such headers.

SUMMARY OF THE INVENTION

The present invention provides a harvesting device for removing a plant portion, such as an ear of corn, from its respective plant stalk. The harvesting device includes a frame and a plurality of row units mounted to the frame. Each row unit has a first gatherer and a second gatherer, both of which have an upper surface. The first gatherer includes a continuous belt. The first and second gatherers are mounted to the frame such that the upper surfaces of the first and second gatherers are parallel with respective first and second planes which are non-coincident.

The present invention further provides a row crop header for an agricultural harvesting machine. The row crop header comprises a frame and a plurality of row units mounted on the frame. Each row unit has a first gatherer and a second gatherer, both of which have an upper surface. The first gatherer includes a continuous belt. The first and second gatherers are mounted to the frame such that the upper surfaces of the first and second gatherers form a trough.

The present invention still further provides a combine for removing ears of corn from respective corn stalks. The combine includes a vehicle supported by and moveable over a surface of an area of soil and a header attached to the vehicle. The header which is adapted to engage the corn stalks includes a frame and a plurality of row units mounted to the frame. Each row unit includes a first gatherer and a second gatherer, both of which have an upper surface. The first gatherer includes a continuous belt. The first and second gatherers are mounted to the frame such that the upper surfaces of the first and second gatherers form a trough.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a top view of a preferred embodiment of a row unit taken generally along line 3—3 of FIG. 2;

FIG. 4 is a cross-sectional view of the row unit taken generally along line 4—4 of FIG. 3;

FIG. 5 is a cross-sectional view of the row unit taken generally along line 5—5 of FIG. 4;

FIG. 6 is a cross-sectional view of the row unit taken generally along line 6—6 of FIG. 4;

FIG. 7 is a cross-sectional view of an alternate embodiment of a row unit; and

FIG. 8 is a schematic front view of the row crop header showing a plurality of adjacent row units of the preferred embodiment in FIGS. 3–5.

DESCRIPTION OF THE PREFERRED EMBODIMENTS

Figure 1:
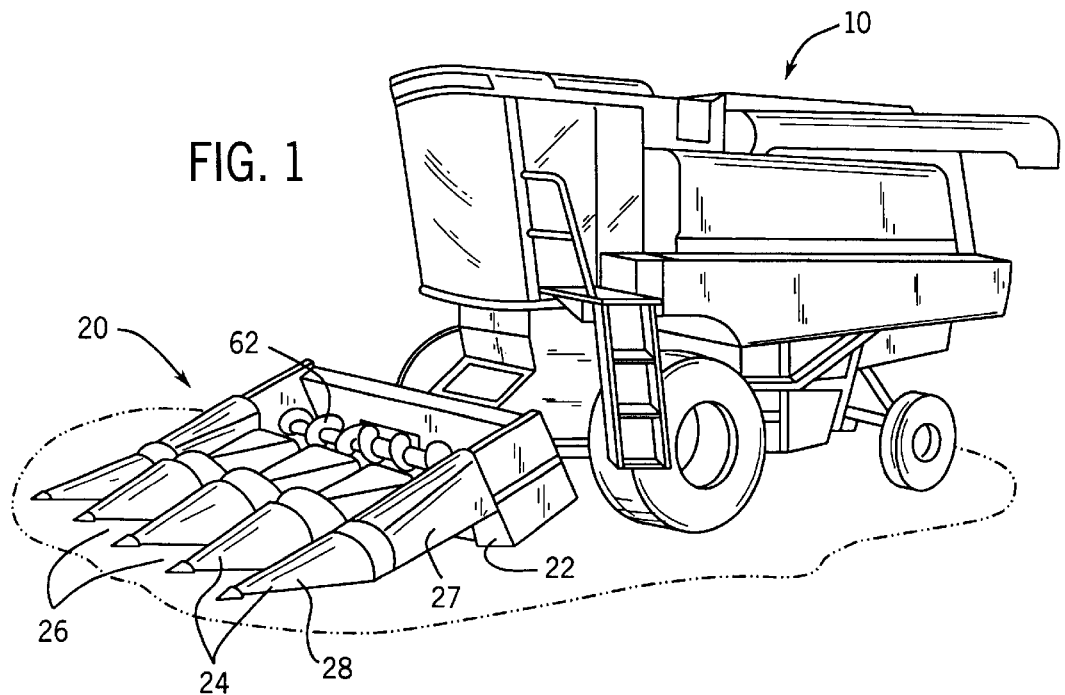
FIG. 1 is a perspective view of a combine including a row crop header.

Turning now to FIG. 1, an improved row crop header 20 is shown supported at the front end of a combine or harvesting machine 10. Improved row crop header 20 has a unique configuration that permits the efficient harvesting of crops, such as corn, planted in rows spaced closer together than in the past.

Figure 2:
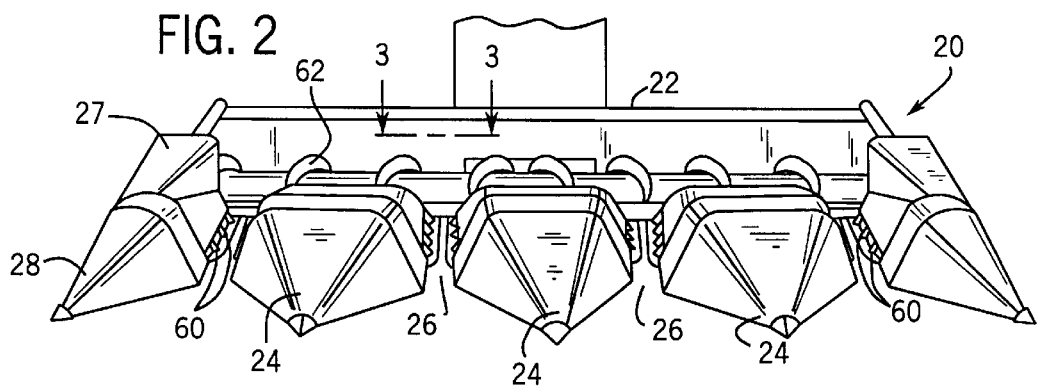
FIG. 2 is a perspective front view of the row crop header shown in FIG. 1.

As shown in FIGS. 1 and 2, improved row crop header 20 has a frame 22 and a plurality of row units 26 connected to frame 22. Row units 26 are covered by a plurality of housings 24.

As best shown in FIGS. 2 and 5, each row unit 26 has a frame end 27 and a head end 28. Frame end 27 of row unit 26 attaches to frame 22, while head end 28 serves as the longitudinal extension of row unit 26 and as a crop engagement device. Thus, row unit 26 extends forward from frame end 27 to head end 28.

As shown in FIGS. 3 and 4, each row unit 26 has a first gatherer 30 and a second gatherer 40. In a preferred embodiment shown in FIGS. 3–5, first and second gatherers 30 and 40 include continuous belts 32 and 42, respectively. Belt 32 of first gatherer 30 is movably supported on rollers 38 and 39 (FIG. 6), and belt 42 of second gatherer 40 is movably supported on rollers 48 and 49 (FIG. 5). Rollers 38 and 48 are drive rollers which move belts 32 and 42 around free-spinning rollers 39 and 49, respectively. Belts 32 and 42 have respective contact surfaces 34 and 44 and upper surfaces 36 and 46. Belts 32 and 42 traverse a substantially oval path extending forward from proximate frame end 27 to proximate head end 28 of row unit 26.

Rollers 38 and 39 of first gatherer 30 and rollers 48 and 49 of second gatherer 40 are rotatably supported by respective members 31 and 41 attached to frame 22. Members 31 and 41 are angled frame members which support rollers 38, 39 and 48, 49 at an angle A with respect to a surface area of soil 5, as shown in FIG. 4. Angle A is preferably between 0 and 45 degrees. This orientation of upper surfaces 36 and 46 of first and second gatherers 30 and 40, respectively, forms a trough 54. Typically, the surfaces of gatherers 30 and 40 are parallel with respective planes which are non-coincident. Mounting first and second gatherers 30 and 40 to frame 22 at angles A allows row units 26 to be spaced closer together. The configuration of trough 54 aids in moving harvested crop, such as ears of corn, from head end 28 toward frame end 27.

As shown in FIG. 8, row crop header 20 of the preferred embodiment has row units 26 connected to frame 22 of row crop header 20 with housing 24 covering adjacent gatherers 40' and 30" of two adjacent row units 26' and 26". Housing 24 also serves as guides for the plant stalks as row crop header 20 is moved forward by harvesting machine 10, shown in FIG. 1.

It is to be understood that "adjacent" row units refer to two row units 26, such as row unit 26' and row unit 26", that are placed next to each other along frame 22, although structural members or other elements could be interposed between the two adjacent row units 26' and 26". Thus, row unit 26' is adjacent to row unit 26" as long as no other row unit 26 is positioned between them even though other structural members or elements may be interposed.

Continuous belts 32 and 42 of first and second gatherers 30 and 40, respectively, may also include a plurality of fingers 60 extending outward from contact surfaces 34 and 44, respectively. Fingers 60 aid in conveying plant portions removed from plant stalks along trough 54. While belts 32 and 42 may employ fingers 60, fingers 60 are not required to convey plant portions along trough 54. Depending upon the type of plant portions, gravity and the friction between belts 32 and 42 and the removed plant portions may provide sufficient contact forces to transport removed plant portions along trough 54.

Continuous belts 32 and 42 provide several advantages over typical gathering chains. First, under some conditions, gathering chains fail earlier on than belts. Gathering chains typically experience wear at their numerous pin connections where there is metal-to-metal sliding contact. This wear is accelerated by dirt and other foreign matter which are inherent in the harvesting process. Because continuous belts do not have metal parts sliding on one another, they would not experience this accelerated wear. Second, the tension of belts can be adjusted to allow gravity and surface tension to provide the forces required to convey the product to the header auger. Using belt tension and gravity can eliminate the need for fingers which take up additional room. Thus, row units may be spaced closer together when belts are used. Finally, belts weigh and, depending upon the configuration, cost less than chains. The typical gathering chain weighs nine pounds or more, whereas a belt normally weighs less than five pounds. In a row crop header with a twelve row arrangement, for example, the use of belts reduces the header weight which the front wheels of the combine must support and, thus, reduces the compaction effect of the combine on the associated field.

In an alternate embodiment shown in FIG. 7, first gatherer 30 includes continuous belt 32, and second gatherer 40 includes a guide bar 50. Similar to first gatherer 30 of the preferred embodiment, belt 32 has a contact surface 34 which may have a plurality of fingers 60 extending outward. Belt 32 is supported by rollers 38 and 39 which are rotatably supported by member 31 attached to frame 22. Member 31 supports rollers 38 and 39 at an angle A with respect to surface 5. Guide bar 50 of second gatherer 40 is attached to frame 22 by member 41 and a support 51. Support 51 secures guide bar 50 to member 41 such that a base 53 of guide bar 50 is parallel to surface 5. Guide bar 50 has a canted (e.g., 45° from surface 5), upper engagement surface 52 for engaging removed plant portions. Thus, upper surface 36 of first gatherer 30 and upper engagement surface 52 of second gatherer 40 form a trough 54. Upper engagement surface 52 has a low coefficient of friction, allowing plant portions to be easily conveyed along guide bar 50 by continuous belt 32 of first gatherer 30. By way of example, guide bar 50 may be fabricated from a solid piece of plastic or a teflon-coated element.

The row crop header 20 described above operates generally as follows. Snapping rolls 56 pull the plant stalks (e.g., corn stalks) so that the plant portions (e.g., ears of corn) are removed from the stalks when they come into contact with stripper plates 58. Stripper plates 58 are mounted onto frame such that stripper plates lie in a plane 59 generally parallel to surface 5. The removed plant portions are then carried backwards along trough 54 by continuous belt 32 of first gatherer 30 and continuous belt 42 or guide bar 50 of second gatherer 40 to a conveying mechanism, such as a cross auger 62, illustrated in FIGS. 1 and 2. Cross auger 62 moves the removed plant portions to a grain housing or collection device (not shown) of harvesting machine 10 on which row crop header 20 is mounted.

As illustrated schematically in FIG. 8, first and second gatherers 30 and 40 are driven by a power source 70 (e.g., conventional gear box and/or chain drive, hydrostatic motor, electric motor). In the preferred embodiment, power source 70 includes a drive shaft 72 with a plurality of gear boxes 74 adapted such that the power outputs from gear boxes 74 drive first gatherer 30, second gatherer 40 and snapping rolls 56. Other embodiments of power source 70 and the power train are also possible. For example, separate power sources (e.g., hydrostatic or electric motors) could be used to drive first and second gatherers 30 and 40 and snapping rolls 56. Alternatively, a single power source could be used with a plurality of drive shafts and drive means.

It will be understood that the foregoing description is of a preferred embodiment of this invention and that the invention is not limited to the specific forms shown. Other embodiments of the row crop header will be apparent to those skilled in the art from consideration of the specification disclosed herein. For example, while the preferred embodiments show members 31 and 41 as angled frame members, other configurations for these members, such as curves, are possible. In addition, first and second gatherers need not be mounted to the frame in parallel, as shown in the preferred and alternate embodiments. First and second gatherers may be mounted askew to one another. It is intended that the specification be considered as exemplary only, with the true scope and spirit of the invention being indicated by the following claims.

I claim:

1. A harvesting device for removing a plant portion supported by a respective plant stalk growing upwardly from a surface of an area of soil, the harvesting device comprising:

a frame; and a plurality of row units mounted on the frame, each of the plurality of row units having a first gatherer and a second gatherer, the first gatherer including a continuous belt, the first and second gatherers each having an upper surface and being mounted to the frame such that the upper surfaces of the first and second gatherers are parallel with respective first and second planes which are non-coincident, each row unit further including a pair of snapping rolls and a pair of stripper plates supported by the frame below the first and second gatherers, the snapping rolls and stripper plates extending along the length of the row unit, the snapping rolls being adapted to pull the plant stalk downward, the skipper plates being adapted to remove the plant portions from the respective plant stalk, the skipper plates cooperating with the first and second gatherers to convey the removed plant portions along the row unit.

2. The harvesting device as recited in claim 1, wherein the continuous belt is movably supported by a pair of rollers, and the movement of the continuous belt conveys the plant portions removed from respective plant stalks along a trough and to a collection device.

3. The harvesting device as recited in claim 2, wherein the second gatherer includes a continuous belt movably supported by a pair of rollers.

4. The harvesting device as recited in claim 3, wherein the first and second planes are inclined at an angle between 0 and 45 degrees with respect to the surface of the area of soil.

5. The harvesting device as recited in claim 2, wherein the second gatherer includes a guide bar, the upper surface of the second gatherer having a low coefficient of friction.

6. The harvesting device as recited in claim 5, wherein the first plane is inclined at an angle between 0 and 45 degrees with respect to the surface of the area of soil.

7. The harvesting device as recited in claim 2, wherein the continuous belt of the first gatherer has an outer surface including a plurality of fingers.

8. The harvesting device as recited in claim 3, wherein the continuous belt of the second gatherer has an outer surface including a plurality of fingers.

9. A combine for removing ears of corn supported by corn stalks from the respective corn stalks, the combine comprising:

a vehicle supported by and moveable over a surface of an area of soil; and a header attached to the vehicle, the header being adapted to engage the corn stalks and including a frame and a plurality of row units mounted on the frame, each of the plurality of row units having a first gatherer and a second gatherer, the first gatherer being inclined at an angle between 0 and 45 degrees with respect to the surface of the area of soil and including a belt, the second gatherer including a guide bar, the first and second gatherers each having an upper surface and being mounted to the frame such that the upper surfaces of the first and second gatherers form a trough, wherein the upper surface of the second gatherer has a low coefficient of friction.

10. A row crop header for an agricultural harvesting machine comprising:

a frame; and a plurality of row units mounted on the frame, each of the plurality of row units having a first gatherer and a second gatherer, the first gatherer including a continuous belt, the first and second gatherers each having an upper surface and being mounted to the frame such that the upper surfaces of the first and second gatherers form a trough, each row unit further including a pair of snapping rolls and a pair of stripper plates disposed below the first and second gatherers and extending along the length of the row unit, the snapping rolls adapted to pull a plant stalk downward, the stripper plates adapted to remove plant portions from the plant stalk, the stripper plates cooperating with the first and second gatherers to convey the removed plant portions along the row unit.

11. The row crop header as recited in claim 10, wherein the continuous belt is movably supported by a pair of rollers, the movement of the continuous belt being sufficient to convey a plant portion removed from a respective plant stalk growing upwardly from a surface of an area of soil along the trough and to a collection device.

12. The row crop header as recited in claim 11, wherein the second gatherer includes a continuous belt movably supported by a pair of rollers.

13. The row crop header as recited in claim 12, wherein the first and second gatherers are inclined at an angle between 0 and 45 degrees with respect to the surface of the area of soil.

14. The row crop header as recited in claim 11, wherein the first gatherer is inclined at an angle between 0 and 45 degrees with respect to the surface of the area of soil, and the second gatherer includes a guide bar, the upper surface of the second gatherer being inclined and having a low coefficient of friction.

15. The row crop header as recited in claim 11, wherein the continuous belt of the first gatherer has an outer surface including a plurality of fingers.

16. The row crop header as recited in claim 12, wherein the continuous belt of the second gatherer has an outer surface including a plurality of fingers.

17. A combine for removing ears of corn supported by corn stalks from the respective corn stalks, the combine comprising:

a vehicle supported by and movable over a surface of an area of soil; and a header attached to the vehicle, the header being adapted to engage the corn stalks and including a frame and a plurality of row units mounted on the frame, each of the plurality of row units having a first gatherer and a second gatherer, the first gatherer including a continuous belt, the first and second gatherers each having an upper surface and being mounted to the frame such that the upper surfaces of the first and second gatherers form a trough, each row unit further including a pair of snapping rolls and a pair of stripper plates disposed beneath the first and second gatherers and extending along the length of the row unit, the snapping rolls adapted to pull the corn stalks downward, the stripper plates adapted to remove the ears from the respective corn stalks, the stripper plates cooperating with the first and second gatherers to convey the removed ears along the row unit.

18. The combine as recited in claim 17, wherein the continuous belt is movably supported by a pair of rollers, the movement of the continuous belt being sufficient to convey the ears of corn removed from the respective corn stalks along the trough and to a collection device.

19. The combine as recited in claim 18, wherein the first and second gatherers are inclined at an angle between 0 and 45 degrees with respect to the surface of the area of soil, and the second gatherer includes a continuous belt movably supported by two rollers.

20. The combine as recited in claim 17, wherein the first gatherer is inclined at an angle between 0 and 45 degrees with respect to the surface of the area of soil, and the second gatherer includes a guide bar, the upper surface of the second gatherer having a low coefficient of friction.

21. A harvesting device for removing a plant portion supported by a respective plant stalk growing upwardly from a surface of an area of soil, the harvesting device comprising:

a frame; and a plurality of row units mounted on the frame, each of the plurality of row units having a first gatherer and a second gatherer, the first gatherer including a continuous belt, the second gatherer including a guide bar, the first and second gatherers each having an upper surface and being mounted to the frame such that the upper surfaces of the first and second gatherers are parallel with respective first and second planes which are non-coincident, wherein the upper surface of the second gatherer has a low coefficient of friction.

22. The harvesting device as recited in claim 21, wherein the first plane is inclined at an angle between 0 and 45 degrees with respect to the surface of the area of soil.

23. A row crop header for an agricultural harvesting machine comprising:

a frame; and a plurality of row units mounted on the frame, each of the plurality of row units having a first gatherer and a second gatherer, the first gatherer including a continuous belt inclined at an angle between 0 and 45 degrees with respect to a surface of an area of soil, the second gatherer including a guide bar, the first and second gatherers each having an upper surface and being mounted to the frame such that the upper surfaces of the first and second gatherers form a trough, wherein the upper surface of the second gatherer is inclined and has a low coefficient of friction.

* * * * *